United States Patent [19]

Meade

[11] Patent Number: 6,010,737
[45] Date of Patent: *Jan. 4, 2000

[54] NUT SPREAD HAVING REDUCED FAT AND REDUCED CALORIES AND PROCESS FOR PRODUCING THE SAME

[75] Inventor: Mary Beth Meade, Far Hills, N.J.

[73] Assignee: CPC International Inc., Englewood Cliffs, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/678,738

[22] Filed: Jul. 11, 1996

[51] Int. Cl.[7] ........................................ A23L 1/38
[52] U.S. Cl. ........................... 426/633; 426/607; 426/611
[58] Field of Search ................... 426/633, 607, 426/611

[56] References Cited

U.S. PATENT DOCUMENTS

| | | | |
|---|---|---|---|
| 5,064,678 | 11/1991 | Klemann et al. | 426/633 |
| 5,258,197 | 11/1993 | Wheeler et al. | 426/607 |
| 5,268,192 | 12/1993 | Zook et al. | 426/633 |
| 5,302,409 | 4/1994 | Franklin | 426/633 |
| 5,411,756 | 5/1995 | Wheeler et al. | 426/607 |
| 5,433,970 | 7/1995 | Wong et al. | 426/633 |
| 5,508,057 | 4/1996 | Wong et al. | 426/633 |
| 5,591,477 | 1/1997 | Boyce et al. | 426/633 |

FOREIGN PATENT DOCUMENTS

| | | |
|---|---|---|
| 892015900 | 1/1990 | European Pat. Off. |
| 2283160 | 5/1995 | United Kingdom |

*Primary Examiner*—Helen Pratt
*Attorney, Agent, or Firm*—Norris, McLaughlin & Marcus

[57] ABSTRACT

A reduced fat and reduced calorie nut butter composition, particularly a peanut butter, having the texture and organoleptic characteristics of full fat nut butters. The nut butter has up to about 60% reduced fat by weight and up to about 34% reduced calories by weight. The composition is produced with full fat nuts and roasted, partially defatted nuts and/or roasted, partially defatted nut flour, a low or no calorie triacylglycerol oil and a low or no calorie bulking agent. The composition also has a nut solids non fat level from about 20–34% and a ratio of total non fat solids to total oil of from about 2.0:1 to about 2.7:1.

19 Claims, No Drawings

NUT SPREAD HAVING REDUCED FAT AND REDUCED CALORIES AND PROCESS FOR PRODUCING THE SAME

BACKGROUND OF THE INVENTION

1. Field of the Invention

The present invention has to do with nut butter compositions having reduced fat and reduced calories. More particularly, the invention relates to peanut spreads employing as ingredients partially defatted peanuts and a low calorie triacylglycerol oil. The compositions of the invention have the texture and organoleptic character of full-fat nut butter products.

2. Description of the Related Art

Peanut butter is a high protein nutritious food but its consumption is believed to be limited by segments of the population who are reducing their fat intake. In the United States, the population consumes an average of greater than 30% of their calories from fat in their diets even though the U.S. Dietary Guidelines issued Jan. 2, 1996 recommend choosing a diet low in fat, saturated fat and cholesterol. A peanut spread with a significantly greater reduction in fat and calories than is currently available would be a desirable food for consumers to help them fit these dietary guidelines, while still providing high protein and nutrition.

Fat reduced peanut butters have been produced by various means such as by mixing with maltodextrin as described in GB Patent No. 2 283 160. This method provides 25% reduced fat but the caloric reduction is negligible because 6 calories/gram peanuts are partially replaced by 4 calories/gram maltodextrin. The texture and viscosity of this product are also lower in quality than a full fat peanut butter.

According to U.S. Pat. No. 5,302,409, a reduced fat peanut butter is made by removing oil from ground peanuts and replacing it with maltodextrin or modified starch. This product claims a 25% reduction in fat, but has negligible caloric reduction and the texture and viscosity are lower in quality than a full fat peanut butter.

European Patent Application No. 89 201590.0 describes a reduced calorie peanut butter made by replacing at least 10% by weight of the peanut oil with medium chain triglycerides. The texture and viscosity are said to be on parity with a full fat peanut butter, but there is no fat or caloric reduction because medium chain triglycerides contain about 9 calories per gram.

A reduced calorie nut butter paste is made according to U.S. Pat. No. 5,268,192 by combining a partially defatted nut flour with a low calorie triglyceride, such as described in U.S. Pat. No. 5,258,197. The textural quality of this product is said to be on parity with a full fat ground nut paste which is not representative of a full fat peanut butter. Moreover, the caloric reduction attained would be minimal because the only ingredient replaced is a 9 calories/gram peanut oil and the tri-glyceride oil used as a replacement has 5 calories/gram.

A process for preparing a high protein or low fat nut spread is described in U.S. Pat. No. 5,433,970. The fat reduction is attained by adding solid diluents, including full-calorie bulking agents, to a full fat nut paste and no caloric reduction is attained.

Nut pastes having a particular monomodal particle size distribution, and monomodal full fat nut butters and monomodal reduced fat nut spreads containing the nut pastes are described in U.S. Pat. No. 5,508,057. The nut butters and spreads have reduced fat but no caloric reduction.

While it is known to make reduced fat peanut butter-type spreads by using partially defatted roasted peanuts ground into a flour, it has been necessary to use an amount such that at most about 9–10% of the oil in the formula is from the partially defatted nuts. It has now been found that certain low calorie or no calorie triacylglycerol oils can be used to replace some of the oil in partially defatted peanuts while maintaining the textural functionality normally associated with full peanut oil peanut butters. Suitable triacylglycerol oils are described in U.S. Pat. No. 5,411,756 and peanut butter has been suggested therein as one of the numerous products in which the oils can be employed. Use of the oils in peanut butter, however, is not exemplified in the patent and the present applicants have unexpectedly found that simply replacing some or all of the peanut oil with the triacylglycerol oils will not result in an acceptable nut butter product and optimal reduction in fat and caloric content cannot be attained by oil replacement alone. Certain ingredients must be employed and certain parameters must be met in order for the oils to function effectively as a fat replacement in peanut butter, while maintaining desirable organoleptic characteristics.

While the present specification makes reference to nut butters and specifically to peanuts and peanut spreads, it is understood that the principles of the invention apply to nuts and seeds other than peanuts, such as cashews, almonds, walnuts, filberts, macadamia nuts, Brazil nuts, pecans, sunflower seeds, sesame seeds and the like.

All percentages and ratios set forth herein are on a weight/weight basis unless specifically designated otherwise.

All references to salt herein mean sodium chloride.

SUMMARY OF THE INVENTION

A reduced fat and reduced calorie nut butter, particularly a peanut spread, having up to about 60% reduced fat by weight, preferably from about 25%–60% reduced fat, and up to about 34% reduced calories by weight, preferably from about 10%–34% reduced calories, is produced with roasted, partially defatted nuts and/or nut flour, a low or no calorie triacylglycerol oil, a low or no calorie bulking agent and full fat roasted nuts. The nut butter also comprises natural and/or artificial sweeteners, carbohydrate solids, salt and a stabilizer. In the case of peanut butter, the fat content of the reduced fat, reduced calorie product is about 29–40% on a total oil content basis. When considering only the amount of oil in the formula that is metabolized, the formula has about 21.5–34% fat.

Applicants have found that certain triacylglycerol oils allow the formulator to use more roasted, partially defatted nuts and/or nut flour, than was previously believed to be possible, without sacrificing texture and organoleptic characteristics, as long as the ratio of non-fat solids to total oil is within a prescribed range. When partially defatted nut flour is employed and partially defatted nuts are not employed, the ratio of the nut flour to the low or no calorie oil also must be within a prescribed range. The triacylglycerol oil replaces the nut oil which has been removed from the partially defatted nuts by conventional means including extraction, expression and the like. In order to use the oil to make a reduced fat and reduced calorie nut butter having acceptable textural and organoleptic characteristics, however, applicants have found that the ratio of non-fat solids to total oil in the formulation must be from about 2.0:1 to 2.7:1, preferably from about 2.20:1 to 2.35:1, and when formulating with nut flour and without partially defatted nuts, the ratio of partially defatted nut flour to the no or low calorie oil must be from about 1.3:1 to about 2.25:1, preferably from about 1.4:1 to about 1.6:1.

The formula of the invention does not have a high viscosity and this allows for the use of a higher percentage of partially defatted nut material as well as low or no calorie bulking agents.

DESCRIPTION OF THE PREFERRED EMBODIMENT

A typical peanut butter manufacturing process is modified to produce the reduced calorie, reduced fat peanut butter spread of the invention by providing a means for the introduction of defatted nut products, triacylglycerol oil and a bulking agent and by providing measurable parameters for the processor.

The ingredients of the invention include full-fat roasted peanuts in an amount from about 18–30%, preferably from about 20–27%, of the formula. Partially defatted roasted peanuts having a fat content from about 10–40% also are employed as a peanuts solids source and these can be used in various forms. For example, a roasted peanut flour having from about 10–30%, preferably from about 10–12% fat can be used, or roasted peanuts (partially defatted) having from about 28–40%, preferably from about 32–34% fat can be used, or a combination of both can be used. The roasted peanut flour is used in an amount from about 0–25%, preferably from about 4–25% and most preferably from about 8–12% of the formula. Partially defatted peanuts are used in an amount from about 0–30%, preferably from about 8–30% and most preferably from about 10–16% of the formula. Suitable partially defatted roasted peanuts are available from Pert Laboratories (division of Seabrook Enterprises) P.O. Box 267, Peanut Drive, Edenton, N.C. 27932 USA, or Golden Peanut Company (in partnership with Universal Blanchers) 1100 Johnson Ferry Road, Suite 900, Atlanta, Ga. 30342 USA.

When formulating with the partially defatted peanut flour and no partially defatted peanuts, a no calorie or low calorie triacylglycerol oil is employed to reconstitute to a nut paste consistency and the ratio of the flour to the oil is from about 1.3:1 to about 2.25:1, preferably from about 1.4:1 to about 1.6:1. The texture is firmer at the higher ratio.

The triacylglycerol oil contributes from about 0–6 calories per gram and has a melt point $\leq 100°$ F. (38° C.), ideally 77° F. (25° C.). Liquid SALATRIM oil, sold under the designation BENEFAT™ III, by Cultor Food Science, 235 East 42nd Street, New York, N.Y. 10017 USA, is the preferred oil. Blends of low calorie oils, such as other forms of SALATRIM, CAPRENIN and OLESTRA, can be used to achieve the desired melt point.

The liquid triacylglycerol oil is used in the formulation at from about 4–18%, with about 11–13% being the preferred usage level range.

Further caloric reduction is attained in the formula through the use of low calorie bulking agents contributing about 0–1.5 calories per gram. The low calorie bulking agents can be used alone or in combinations at from about 2–38% of the formula, preferably their combined total in the formula is about 28–33%. They can include such bulking agents as polydextrose (LITESSE® from Cultor Food Science), inulin (RAFTILINE® from Rhone Poulenc, Food Ingredients Division, 1130 East Maiden Street, Washington, Pa. 15301 USA, or FRUTAFIT® from Imperial Suiker Unie, One Imperial Square, P.O. Box 9, Sugar Land, Tex. 77487 USA) and microcrystalline cellulose (AVICEL® or INDULGE™ from FMC Corp., Food Ingredients Division, 1735 Market Street, Philadelphia, Pa. 19103 USA).

The distribution of non fat solids in the finished peanut butter product are in the particle size range of about 95% minimum$\leq 65$ microns, about 75% minimum$\leq 25$ microns, about 60% minimum$\geq 6$ microns. The mean particle diameter is about 12–20 microns, preferably about 14–16 microns. The ratio of non-fat solids to total oil in the formulation must be from about 2.0:1 to 2.7:1, preferably from about 2.20:1 to 2.35:1

The peanut butter manufacturing process of the invention includes a particle size reduction step in order to attain the desired particle size distribution in the final product. This process includes milling, such as with a comminuting or asima mill, homogenizing, or a grinding step applied to the peanut butter post mixing of the ingredients.

Sweeteners and other carbohydrate solids such as sugar, corn syrup solids or high potency sweeteners can be used alone or in combinations from about 0.05–18% of the formula. When the sweetener is sugar, for example, it is added in an amount from about 0–12%, preferably from about 8–11%. Other conventional natural sweeteners can be employed such as honey and dextrose, and other carbohydrate solids can be employed such as maltodextrins and starches. Artificial sweeteners such as ASPARTAME® also can be used for further caloric reduction. The amount of natural and/or artificial sweeteners employed will vary dependent upon the sweetness desired as will be apparent to those skilled in the art.

The reduced fat and reduced calorie peanut butter also contains full-fat roasted peanuts, salt and a hydrogenated or partially hydrogenated vegetable oil stabilizer for the oil system. The salt is used in an amount from about 1–2% and the stabilizer is generally employed in an amount from about 0.5–3.5%, preferably from about 0.5–2.0%. The stabilizer system also can optionally include emulsifiers such as monoglycerides, diglycerides, lecithin and propylene glycol monoesters.

The peanut solids non fat level in the formula can range from about 20–34%. The preferred range is about 25–29% to maximize peanut flavor, maximize a soft, spreadable texture and minimize in-process viscosity. This compares to a typical peanut solids non fat level of 27–29% in the 25% reduced fat peanut butter spreads currently on the market in the United States.

The in-process Brookfield apparent viscosity of the peanut butter after mixing and particle size reduction steps, is about 6,000–50,000 centipoise, with the preferred viscosity being about 7,000–9,000 centipoise (Brookfield TC spindle at 4 rpm or TD spindle at 20 rpm, with helipath, after 1 minute at 65–85° C.).

The density of the peanut butter is a maximum of about 1.248 grams/cc, with a target density of about 1.240–1.245 grams/cc. This criteria ensures a 37 gram weight serving for 30 mls (two tablespoons) and allows for a 40% fat reduction and a 25% caloric reduction label claim where volume declaration of serving size is mandated.

A general process for making nut butter according to the invention is as follows:
  a) mix or grind from about 18–30% roasted, full fat nuts and from about 0–30% roasted, partially defatted nuts, into a slurry,
  b) admix the slurry of a) with from about 0–25% of roasted, partially defatted nut flour and a low or no calorie triacylglycerol oil and optionally mill, c) admix a sweetener, salt, stabilizer and low or no calorie bulking agent with the admixture of b) to make a paste, followed by milling or optionally milling if milling was conducted in step b), and d) deaerating and cooling the product of c).

EXAMPLES

All formulations in the following examples are for a 50% reduced fat and 34% reduced calorie (weight basis) peanut butter as compared with full fat peanut butter. The compositions of the examples target a label claim of 40% reduced fat and 25% reduced calories, per U.S. designated serving size of two tablespoons.

Example I

A reduced fat, reduced calorie peanut butter was made using the following ingredients:

| Ingredient | Wt. % (wet basis) | Total carbo. | Total fat | Total prot. | Cal.per 100 g. |
|---|---|---|---|---|---|
| FORMULATION | | | | | |
| ROASTED PEANUTS | 23.00 | 2.76 | 12.19 | 7.13 | 138.00 |
| PARTIALLY DE-FATTED PEANUTS | 16.00 | 3.20 | 5.44 | 6.08 | 79.65 |
| PARTIALLY DE-FATTED PEANUT FLOUR | 8.00 | 2.01 | 0.96 | 4.40 | 31.48 |
| SALATRIM | 11.00 | 0.00 | 6.05 | 0.00 | 53.48 |
| SUGAR | 7.50 | 7.46 | 0.00 | 0.00 | 30.37 |
| POLYDEXTROSE | 24.00 | 23.04 | 0.00 | 0.00 | 27.65 |
| INULIN | 8.00 | 7.68 | 0.00 | 0.00 | 11.52 |
| STABILIZER | 0.90 | 0.00 | 0.90 | 0.00 | 7.53 |
| SALT | 1.60 | 0.00 | 0.00 | 0.00 | 0.00 |
| Total | 100.00 | 46.15 | 25.54 | 17.61 | 379.7 |

Formulation Parameters:

solids:oil 2.28:1 peanut solids non fat 28.41%

All of the ingredients were fed simultaneously into a mill at a set feed rate to ensure correct proportions according to the formula. Mill settings were such as to ensure a particle size distribution of 95% minimum≦65 microns, 75% minimum≦25 microns, 60% minimum≧6 microns and a mean diameter of 12–20 microns, preferably 14–16 microns, and an apparent viscosity of 6,000–50,000 centipoise, with the preferred viscosity of 7,000–9,000 centipoise out of the mill. The milled composition was then deaerated and cooled.

The peanut butter had a soft, spreadable texture and strong peanut flavor representative of full fat peanut butters.

Example II

A reduced fat, reduced calorie peanut butter was made using the process of Example I and the following ingredients:

| Ingredient | Wt. % (wet basis) | Total carbo. | Total fat | Total prot. | Cal.per 100 g. |
|---|---|---|---|---|---|
| FORMULATION | | | | | |
| ROASTED PEANUTS | 22.00 | 2.64 | 11.66 | 6.82 | 132.00 |
| PARTIALLY DE-FATTED PEANUTS | 14.00 | 2.80 | 4.76 | 6.32 | 69.70 |
| PARTIALLY DE-FATTED PEANUT FLOUR | 10.00 | 2.51 | 1.20 | 5.50 | 39.34 |
| SALATRIM | 12.00 | 0.00 | 6.60 | 0.00 | 58.34 |
| SUGAR | 8.50 | 8.46 | 0.00 | 0.00 | 34.42 |
| POLYDEXTROSE | 23.00 | 22.08 | 0.00 | 0.00 | 26.50 |
| INULIN | 8.00 | 7.68 | 0.00 | 0.00 | 11.52 |
| STABILIZER | 0.90 | 0.00 | 0.90 | 0.00 | 7.53 |
| SALT | 1.60 | 0.00 | 0.00 | 0.00 | 0.00 |
| Total | 100.00 | 46.17 | 25.12 | 17.64 | 379.4 |

Formulation Parameters:

solids:oil 2.28:1 peanut solids non fat 28.38%

This peanut butter had a soft, spreadable texture and strong peanut flavor representative of full fat peanut butters.

Example III

A reduced fat, reduced calorie peanut butter was made using the process of Example I and the following ingredients:

| Ingredient | Wt. % (wet basis) | Total carbo. | Total fat | Total prot. | Cal.per 100 g. |
|---|---|---|---|---|---|
| FORMULATION | | | | | |
| ROASTED PEANUTS | 22.00 | 2.64 | 11.66 | 6.82 | 132.00 |
| PARTIALLY DE-FATTED PEANUTS | 20.00 | 4.00 | 5.80 | 7.60 | 99.57 |
| SALATRIM | 10.00 | 0.00 | 5.50 | 0.00 | 48.62 |
| SUGAR | 8.00 | 7.96 | 0.00 | 0.00 | 32.40 |
| CORN SYRUP SOLIDS | 5.00 | 4.80 | 0.00 | 0.00 | 19.54 |
| POLYDEXTROSE | 24.50 | 23.52 | 0.00 | 0.00 | 28.22 |
| INULIN | 8.00 | 7.68 | 0.00 | 0.00 | 11.52 |
| STABILIZER | 0.90 | 0.00 | 0.90 | 0.00 | 7.53 |
| SALT | 1.60 | 0.00 | 0.00 | 0.00 | 0.00 |
| Total | 100.00 | 50.60 | 24.66 | 14.42 | 379.4 |

Formulation Parameters:

solids:oil 2.43:1 peanut solids non fat 24.54%

This formula did not employ partially defatted peanut flour. The peanut butter had a good peanut flavor and a spreadable texture similar to a full fat peanut butter.

Example IV

A reduced fat, reduced calorie peanut butter was made using the process of Example I and the following ingredients:

| Ingredient | Wt. % (wet basis) | Total carbo. | Total fat | Total prot. | Cal.per 100 g. |
|---|---|---|---|---|---|
| FORMULATION | | | | | |
| ROASTED PEANUTS | 32.00 | 3.84 | 16.96 | 9.92 | 192.01 |
| PARTIALLY DE-FATTED PEANUTS | 8.00 | 1.60 | 2.72 | 3.04 | 39.63 |

-continued

| Ingredient | Wt. % (wet basis) | Total carbo. | Total fat | Total prot. | Cal.per 100 g. |
|---|---|---|---|---|---|
| PARTIALLY DE-FATTED PEANUT FLOUR | 4.00 | 1.00 | 0.48 | 2.20 | 15.74 |
| SALATRIM | 6.00 | 0.00 | 3.30 | 0.00 | 29.17 |
| SUGAR | 8.00 | 7.96 | 0.00 | 0.00 | 32.40 |
| CORN SYRUP SOLIDS | 5.00 | 4.80 | 0.00 | 0.00 | 19.54 |
| POLYDEXTROSE | 26.30 | 25.25 | 0.00 | 0.00 | 30.30 |
| INULIN | 8.00 | 7.68 | 0.00 | 0.00 | 11.52 |
| STABILIZER | 1.10 | 0.00 | 1.10 | 0.00 | 9.21 |
| SALT | 1.60 | 0.00 | 0.00 | 0.00 | 0.00 |
| Total | 100.00 | 52.13 | 24.56 | 15.16 | 379.7 |

Formulation Parameters solids:oil 2.67:1 peanut solids non fat 23.84%

The peanut butter had a high quality peanut flavor due to the higher full fat peanut level. The solids:oil ratio was in the high end of the acceptable range and the peanut solids non fat percent was in the low end of the acceptable range so that the denseness of the product was comparable to a full fat peanut butter.

Example V

A reduced fat, reduced calorie peanut butter was made using the process of Example I and the following ingredients:

| Ingredient | Wt. % (wet basis) | Total carbo. | Total fat | Total prot. | Cal.per 100 g. |
|---|---|---|---|---|---|
| ROASTED PEANUTS | 20.40 | 2.45 | 10.81 | 6.32 | 122.40 |
| PARTIALLY DE-FATTED PEANUT FLOUR | 24.00 | 6.02 | 2.66 | 13.20 | 94.43 |
| SALATRIM | 17.00 | 0.00 | 9.35 | 0.00 | 82.65 |
| SUGAR | 8.70 | 6.66 | 0.00 | 0.00 | 35.23 |
| POLYDEXTROSE | 19.00 | 18.24 | 0.00 | 0.00 | 21.69 |
| INULIN | 8.00 | 7.68 | 0.00 | 0.00 | 11.52 |
| STABILIZER | 1.30 | 0.00 | 1.30 | 0.00 | 10.66 |
| SALT | 1.60 | 0.00 | 0.00 | 0.00 | 0.00 |
| Total | 100.00 | 43.05 | 24.34 | 19.52 | 379.0 |

Formulation Parameters solids:oil 2.13:1 peanut flour: SALATRIM 1.41:1 peanut solids non fat 30.93%

This formulation did not employ partially defatted peanuts.

The peanut solids non fat percent was in the high end of the acceptable range due to the high amount of partially defatted peanut flour in the formula and the peanut butter denseness was reduced by formulating the solids:oil ratio in the low end of the acceptable range.

Example VI

A twenty point experimental design was made on formulation ranges of ingredients for reduced fat, reduced calorie peanut butter. A wide range of textures was produced, all representative for acceptable reduced fat, reduced calorie peanut butters.

For the effect of formulation factors on peanut butter textural attributes, the correlation coefficients listed, >0.50, are statistically significant at $p \leq 0.05$. For example: To minimize the denseness of a reduced fat, reduced calorie peanut butter formulation, percent triacylglycerol oil and percent corn syrup solids and polydextrose is increased, while solids to oil ratio is reduced and percent peanut solids non fat is reduced.

The results are summarized in Table VI.

TABLE VI

Statistical Correlations Between Ingredient Levels and Texture Responses

| Texture Response | % Peanuts | % Partially Defatted Peanuts | % Partially Defatted Flour | % Salatrim | % Corn Syrup Solids + Polydextrose | Solids to Oil Ratio | % Peanut Solids | Team Ranking of Firmness |
|---|---|---|---|---|---|---|---|---|
| Texture Profile: | | | | | | | | |
| Denseness | | | | −0.67 | −0.54 | 0.56 | 0.74 | 0.93 |
| Force to Compress | | | | −0.74 | | 0.65 | 0.60 | 0.97 |
| Amount of Spread | | | | 0.69 | | −0.60 | −0.62 | −0.96 |
| Slipperiness | | | | −0.51 | | | 0.55 | 0.67 |
| Adhesiveness-Compression Amount of Manip. Required | | | | 0.70 | | 0.64 | | 0.87 |

TABLE VI-continued

Statistical Correlations Between Ingredient Levels and Texture Responses

| Texture Response | % Peanuts | % Partially Defatted Peanuts | % Partially Defatted Flour | % Salatrim | % Corn Syrup Solids + Polydextrose | Solids to Oil Ratio | % Peanut Solids | Team Ranking of Firmness |
|---|---|---|---|---|---|---|---|---|
| Adhesiveness-Manipulation | | | | | | | | |
| Cohes. of Mass | | | 0.61 | | −0.62 | | 0.76 | 0.88 |
| Mixes with Saliva | | | −0.57 | 0.56 | 0.56 | | −0.74 | 0.94 |
| Rate of Dissipation | | | −0.56 | 0.55 | 0.56 | | −0.73 | −0.93 |
| Particle Amount | | | −0.65 | | 0.63 | | −0.59 | |
| Particle Size | 0.53 | | −0.56 | | 0.57 | | | |
| Effort to Swallow | | | 0.51 | 0.64 | | 0.55 | 0.66 | 0.90 |
| Oily Mouthcoat Residue | | | | 0.53 | | | | −0.59 |
| Toothpacking | | | −0.65 | | 0.63 | | −0.54 | |
| Instrumental: | | | | | | | | |
| Brookfield (1 min.) | | | | −0.85 | | 0.78 | 0.64 | 0.93 |
| Density (g/ml pycnom.) | | | −0.78 | | 0.68 | | −0.66 | |

What is claimed is:

1. A nut butter composition having reduced fat and reduced calories and the texture and organoleptic characteristics of full fat nut butters consisting essentially of:
   a) from about 18–30% of ground, roasted, full fat nuts,
   b) from about 0–25% of roasted, partially defatted nut flour,
   c) from about 0–30% of ground, roasted, partially defatted nuts,
   d) from about 4–18% of a low or no calorie triacyiglycerol oil,
   e) from about 0.05–18% of a sweetener,
   f) from about 1.0–2.0% of salt,
   g) from about 0.5–3.5% of a stabilizer/emulsifier system, and
   h) from about 2–38% of a low or no calorie bulking agent,
   wherein the nut butter has a particle size distribution of about 95% minimum ≦65 microns, about 75% minimum ≦25 microns, about 60% minimum ≧6 microns and a mean diameter of about 12–20 microns, a nut solids non fat level from about 20–34% and the ratio of total non fat solids to total oil is from about 2.0:1 to about 2.7:1.

2. The nut butter composition of claim 1 wherein the nut butter is peanut butter.

3. The composition of claim 1 wherein the ground, roasted, full fat nuts are present in an amount of from about 20% to about 27%.

4. The composition of claim 1 wherein the roasted, partially defatted nut flour is present in an amount of from about 4% to about 25%.

5. The composition of claim 4 wherein the ratio of roasted, partially defatted nut flour to triacylglycerol oil is from about 1.3:1 to about 2.25:1.

6. The composition of claim 4 wherein the ground, roasted, partially defatted nuts are present in an amount of from about 8% to about 30%.

7. The composition of claim 6 wherein the nuts are peanuts.

8. The composition of claim 1 wherein the ground, roasted, partially defatted nuts are present in an amount of from about 8% to about 30%.

9. The composition of claim 1 wherein the nut butter is peanut butter and the composition has 0% of ground, roasted, partially defatted nuts and has a ratio of roasted, partially defatted nut flour to triacylglycerol oil of from about 1.3:1 to about 2.25:1.

10. The nut butter composition of claim 1 having an in process Brookfield apparent viscosity of about 6,000 to about 50,000 centipoise.

11. A process for producing a reduced fat and reduced calorie nut butter having the texture and organoleptic character of full-fat nut butters comprising:
   a) mixing or grinding from about 18–30% roasted, full fat nuts and from about 0–30% roasted, partially defatted nuts into a slurry,
   b) admixing the slurry of a) with from about 0–25% roasted, partially defatted nut flour and a low or no calorie triacylglycerol oil and optionally milling,
   c) admixing a sweetener, salt, stabilizer/emulsifier and low or no calorie bulking agent with the admixture of b) to make a paste, followed by milling, or optionally milling if milling was conducted in b), and,
   d) deaerating and cooling the product of c), wherein the nut butter has a particle size distribution of about 95% minimum≦65 microns, about 75% minimum≦25 microns, about 60% minimum≧6 microns and a mean diameter of about 12–20 microns, a nut solids non fat level from about 20–34% and the ratio of total non fat solids to total oil is from about 2.0:1 to about 2.7:1.

12. The process of claim 11 wherein the triacylglycerol oil is present in an amount from about 4–18%; the sweetener is present is an amount from about 0.05–18%; the salt is present in an amount from about 1.0–2.0%; the stabilizer/emulsifier is present in an amount from about 0.5–3.5% and the low or no calorie bulking agent is present in an amount from about 2–38%.

13. The process of claim 12 wherein the nut butter is peanut butter.

14. The process of claim 12 wherein 0% roasted, partially defatted nuts are employed and the ratio of roasted, partially defatted nut flour to triacylglycerol oil is from about 1.3:1 to about 2.25:1.

15. The product of the process of claim 11.

16. The process of claim 11 wherein said nut butter has an in process Brookfield apparent viscosity of about 6,000 to about 50,000 centipoise.

17. A process for producing a reduced fat and reduced calorie nut butter having the texture and organoleptic character of full-fat nut butters, comprising admixing from about 18–30% roasted, full fat nuts, from about 0–30% roasted, partially defatted nuts, from about 0–25% roasted, partially defatted nut flour, from about 4–18% of a low or no calorie triacylglycerol oil, from about 0.05–18% of a sweetener, from about 1.0–2.0% salt, from about 0.5–3.5% of a stabilizer/emulsifier system, and from about 2–38% of a low or no calorie bulking agent, milling the admixture, and deaerating and cooling the milled admixture, wherein the nut butter has a particle size distribution of about 95% minimum $\leq$ 65 microns, about 75% minimum $\leq$ 25 microns, about 60% minimum $\geq$ 6 microns and a mean diameter of about 12–20 microns, a nut solids non fat level from about 20–34% and a ratio of total non fat solids to total oil of from about 2.0:1 to about 2.7:1.

18. The product of the process of claim 17.

19. The process of claim 17 wherein said nut butter has an in process Brookfield apparent viscosity of about 6,000 to about 50,000 centipoise.

* * * * *